US010640077B2

United States Patent
Stellwagen et al.

(10) Patent No.: US 10,640,077 B2
(45) Date of Patent: May 5, 2020

(54) GAS GENERATOR ASSEMBLY WITH GUIDE ELEMENT

(71) Applicant: TAKATA AG, Aschaffenburg (DE)

(72) Inventors: Michael Stellwagen, Aschaffenburg (DE); Rüdiger Behre, Rödermark (DE); Karl Bayer, Berg (DE)

(73) Assignee: JOYSON SAFETY SYSTEMS GERMANY GMBH, Berlin (DE)

( * ) Notice: Subject to any disclaimer, the term of this patent is extended or adjusted under 35 U.S.C. 154(b) by 110 days.

(21) Appl. No.: 15/749,722

(22) PCT Filed: Jul. 26, 2016

(86) PCT No.: PCT/EP2016/067788
§ 371 (c)(1),
(2) Date: Feb. 1, 2018

(87) PCT Pub. No.: WO2017/021215
PCT Pub. Date: Feb. 9, 2017

(65) Prior Publication Data
US 2018/0222436 A1    Aug. 9, 2018

(30) Foreign Application Priority Data

Aug. 6, 2015  (DE) .................. 10 2015 215 025

(51) Int. Cl.
| | | |
|---|---|---|
| *B60R 21/264* | (2006.01) | |
| *B60R 21/261* | (2011.01) | |
| *B60R 21/26* | (2011.01) | |

(52) U.S. Cl.
CPC .......... *B60R 21/264* (2013.01); *B60R 21/261* (2013.01); *B60R 2021/26011* (2013.01);
(Continued)

(58) Field of Classification Search
CPC ................ B60R 21/264; B60R 21/261; B60R 2021/2648; B60R 2021/26011; B60R 2021/26076
See application file for complete search history.

(56) References Cited

U.S. PATENT DOCUMENTS 3,813,007 A * 5/1974 Doin .......................... B01J 7/00
222/4
5,139,280 A   8/1992 Cord et al.
(Continued)

FOREIGN PATENT DOCUMENTS

DE        90 13 130 U1    11/1990
DE        690 00 860 T2    7/1993
(Continued)

OTHER PUBLICATIONS

International Search Report dated Oct. 20, 2016 issued in International Patent Application No. PCT/EP 2016/067788; Filed Jul. 26, 2016.

*Primary Examiner* — Darlene P Condra
(74) *Attorney, Agent, or Firm* — Gordon Rees Scully; Mansukhani, LLP

(57) ABSTRACT

A gas generator assembly for an airbag module of a motor vehicle, including a generator housing with a first housing part and a second housing part, a combustion space formed in the generator housing for accommodating a pyrotechnic charge from which a gas for inflating a gas bag of the airbag module can be generated by combustion. At least one outlet opening is provided in the generator housing through which gas generated in the combustion space can be released for inflating the gas bag. At least one filter unit is arranged in the generator housing for filtering the gas generated from the pyrotechnic charge. The assembly includes a guide element arranged in the generator housing, by means of which the
(Continued)

generated gas is guided to the at least one outflow opening. The guide element is of tubular form and has at least one deformation area.

14 Claims, 1 Drawing Sheet

(52) U.S. Cl.
CPC ............... *B60R 2021/2648* (2013.01); *B60R 2021/26076* (2013.01)

(56) References Cited

U.S. PATENT DOCUMENTS

| | | | |
|---|---|---|---|
| 5,268,013 A | 12/1993 | Bruncher et al. | |
| 5,330,730 A * | 7/1994 | Brede | B60R 21/264 280/736 |
| 5,398,967 A | 3/1995 | Carothers et al. | |
| 6,886,855 B2 * | 5/2005 | Cheal | B60R 21/2644 280/736 |
| 2002/0070540 A1 | 6/2002 | Yamazaki et al. | |
| 2003/0150519 A1 * | 8/2003 | Lell | B60R 21/272 141/313 |
| 2003/0222443 A1 | 12/2003 | Cheal et al. | |
| 2004/0163565 A1 * | 8/2004 | Gabler | B60R 21/2644 102/530 |
| 2010/0117344 A1 | 5/2010 | Windhausen et al. | |
| 2017/0015273 A1 * | 1/2017 | Kobayashi | B60R 21/268 |
| 2017/0166160 A1 * | 6/2017 | Izuma | B60R 21/264 |

FOREIGN PATENT DOCUMENTS

| | | |
|---|---|---|
| DE | 694 18 608 T2 | 10/1999 |
| DE | 199 29 279 A1 | 12/1999 |
| DE | 603 07 096 T2 | 2/2007 |
| DE | 10 2007 033 344 A1 | 5/2009 |
| EP | 1 331 143 B1 | 8/2012 |

* cited by examiner

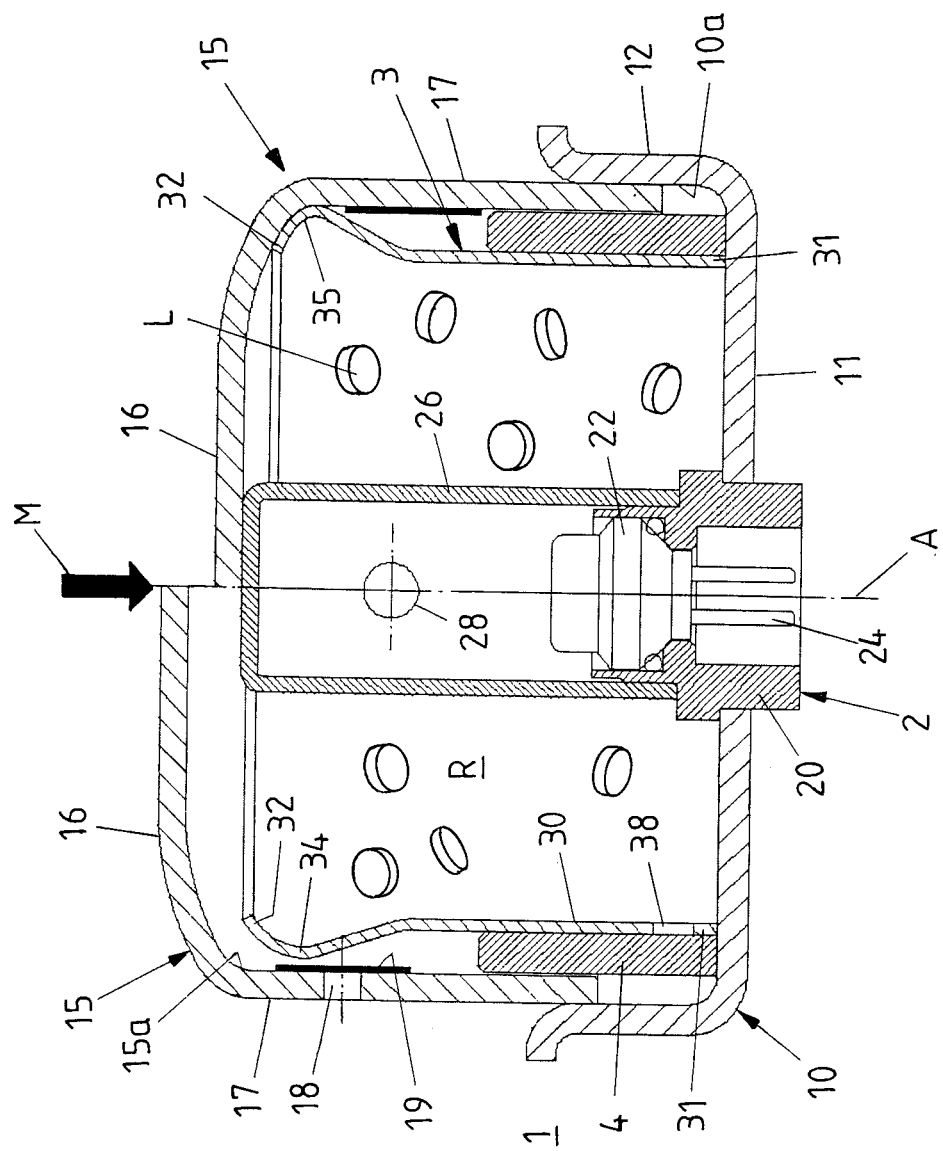

GAS GENERATOR ASSEMBLY WITH GUIDE ELEMENT

CROSS-REFERENCE TO A RELATED APPLICATION

This application is a National Phase Patent Application of International Patent Application Number PCT/EP2016/067788, filed on Jul. 26, 2016, which claims priority of German Patent Application Number 10 2015 215 025.9, filed on Aug. 6, 2015.

BACKGROUND

This invention relates to a gas generator assembly for an airbag module of a motor vehicle.

Such gas generator assembly comprises a generator housing with a first housing part and a second housing part, in which a combustion space is formed for accommodating a pyrotechnic charge, from which a gas for inflating a gas bag of the airbag module can be generated by combustion, and at least one outlet opening of the generator housing, through which gas generated in the combustion space can be released for inflating the gas bag. Furthermore, at least one filter unit is arranged in the generator housing in order to cool the gas generated from the pyrotechnic charge and/or liberate the same from noxious substances, wherein a guide element is associated with the filter unit, by means of which the gas stream generated is conducted such that it is guided via the filter unit to the at least one outlet opening.

A gas generator assembly of this type is known for example from EP 1 331 143 B1.

To ensure a filtration as reliable as possible of the gases to be released from the generator housing by means of such an arrangement, all gases generated in the combustion chamber should pass the filter unit before they reach the outlet opening(s). For this purpose, it can be required to seal certain areas in the interior of the generator housing in order to exclude undesired flow paths of the gas.

SUMMARY

It is a problem underlying the invention to create a gas generator assembly as mentioned above, which with simple means provides for a reliable filtration of the gases generated in the combustion chamber.

According to the invention, this problem is solved by creating a gas generator assembly with features as described herein.

Accordingly, the guide element is of tubular form and has at least one deformation area by which the guide element bears against the second housing part of the gas generator assembly such that a possible flow path of the gas within the generator housing thereby is closed, via which the gas generated in the combustion chamber otherwise might get to an outlet opening of the generator housing without passing the filter unit.

The solution according to the invention has the advantage that with a guide element of simple construction, which for example is open on two sides and correspondingly is of low weight, a targeted sealing of certain areas within the generator housing becomes possible in order to ensure that gas generated in the combustion space of the generator housing passes the filter unit before it gets to the at least one outlet opening of the generator housing.

The at least one deformation area of the guide element is produced in an additional working step after the original forming of the guide element (the latter by primary forming and/or shaping), namely after the guide element has been arranged in the generator housing or a housing part thereof. The deformation of the guide element then can be effected in a targeted way, so that the same with its deformation area bears against a component of the generator housing, in particular against the generator housing or its inner wall, in order to prevent a gas flow to the at least one outlet opening of the generator housing by bypassing the filter unit.

The local deformation of the guide element in order to create a deformation area thereon can be effected automatically for example during the manufacture of the gas generator assembly, in particular during the assembly of the generator housing. For this purpose it can be provided for example that during the assembly of the generator housing from at least two housing parts the guide element is placed in one of the housing parts, and that during the subsequent proper arrangement of a further housing part on the one housing part the further housing part acts on the guide element and deforms the same such that the resulting deformation area of the guide element sealingly bears against a further component of the gas generator assembly, in particular against the inner wall of one of the housing parts.

For the targeted formation of a deformation area at a particular point of the guide element, so that the deformation area in a targeted way bears against a component of the gas generator assembly in order to exclude particular paths of the gas stream, the guide element can have a tear region in which the same is deformed primarily upon application of an external force. This tear region for example can be formed by a pre-deformation and/or a material weakening of the guide element.

The guide element advantageously is designed such that it surrounds the combustion space of the gas generator assembly, wherein in addition the ignition device of the gas generator assembly protrudes into the space surrounded by the guide element.

In particular for use in a tubular housing, the guide element is of tubular form and according to one embodiment can each be open at its two end portions (as seen along the tube axis). Concretely, the guide element can be designed substantially hollow cylindrical. By means of the deformation area formed on the guide element it will then be prevented for example that gas which flows through one of the open top surfaces of the guide element gets to an outlet opening of the gas generator assembly without passing the filter unit.

For the targeted supply of gas to the filter unit the guide element can include at least one passage opening, e.g. in a tubular circumferential side wall.

A method for manufacturing a gas generator assembly according to the invention is described herein.

BRIEF DESCRIPTION OF THE DRAWING

Further details and advantages of the invention will become apparent from the following description of an exemplary embodiment.

FIG. 1 shows a gas generator assembly of an airbag module for a motor vehicle.

DETAILED DESCRIPTION

FIG. 1 shows a gas generator assembly of an airbag module for a motor vehicle, comprising a generator housing 1, an ignition device 2, a guide element 3 and a filter unit 4.

The generator housing 1 is of multipart design, in the exemplary embodiment concretely of two-part design, and is formed by two (each pot-shaped) housing parts 10, 15. The two housing parts 10, 15 each have a bottom 11, 16 and a circumferential side wall 12, 17 protruding therefrom, which is annular in cross-section. On their upper side (top surface) opposite the respective bottom 11, 16 the two housing parts 10, 15 are open.

The generator housing 1 extends in a tubular fashion along an axis A. The housing parts 10, 15 each are formed rotationally symmetrical with respect to the axis A.

In FIG. 1, the two housing parts 10, 15 to the left of the axis A are shown in a first condition in which the same are assembled along a mounting direction M. To the right of the axis A the two housing parts 10, 15 are shown in the fully assembled condition.

In the assembled condition, the bottoms 11, 16 of the two housing parts 10, 15 oppose each other (along the axis A); and the two housing parts 10, 15 also bear against each other on their side walls 12, 17. In the exemplary embodiment the side wall 17 of the second housing part 15 (housing upper part) concretely protrudes into the first housing part 10 (housing lower part) and bears against the inner surface 10a of its side wall 12.

In the fully assembled condition the generator housing 1 encloses an interior space into which in the exemplary embodiment an ignition device 2 protrudes on the one hand and which on the other hand forms a combustion space R in which by combustion of a pyrotechnic charge L (to be ignited by means of the ignition device 2) a gas can be generated for inflating a gas bag associated with the gas generator assembly.

For releasing the gas generated in the combustion space R, the generator housing 1 includes outlet openings of which an outlet opening 18 can be seen in the cross-sectional representation of FIG. 1. A respective outlet opening 18 is closed by means of a bursting element 19, in the exemplary embodiment in the form of an adhered bursting foil. Upon ignition of the gas generator a respective bursting element is destroyed by the generated hot gases, so that the gas can flow through the outlet opening(s) 18 into the gas bag to be inflated.

The ignition device 2 arranged on the generator housing 1 comprises an igniter 22 which protrudes into the generator housing 1 as well as a contact area 24 via which the ignition device 1 is (electrically) connectable with a control device in order to be able to activate the ignition device 2 for igniting the gas generator. In the exemplary embodiment, the igniter 22 and the contact area 24 are arranged in a common igniter housing 20 which is fixed at the generator housing 1, more exactly at the bottom 11 of the first housing part 10. Within the generator housing 1 the igniter 22 is surrounded by a charge container 26 in which a charge is accommodated for ignition reinforcement. The charge container 26 is connected with the combustion space R in the interior of the generator housing 1 via openings 28, so that upon activation of the ignition device 2 a pyrotechnic charge L arranged in the combustion space R is ignited in order to therefrom generate a gas for inflating a gas bag.

Within the generator housing 1 the combustion space R is surrounded by a guide element 3 which in the exemplary embodiment is of tubular form. The tubular guide element 3 extends along the axis A of the generator housing 1 from a first end portion 31 to a second end portion 32. The first end portion 31 is arranged on the bottom 11 of the first housing part 10; and the second end portion 32 adjoins the bottom 16 of the second housing part 15. In the exemplary embodiment, the guide element 3 concretely is designed rotationally symmetrical with respect to the axis A. It has a substantially hollow cylindrical shape—with a circumferential boundary wall 30 circular-ring-shaped in cross-section.

The guide element 3 in particular can be made of an (elastically deformable) metallic material, such as steel. However, there can also be used other materials, such as temperature-resistant plastic materials, fiber-reinforced lightweight materials (e.g. carbon) or the like.

At its two axial end portions 31, 32 the guide element 3 each has an open top surface. This means that gas generated in the combustion space R in principle can exit from the combustion space R surrounding the guide element 3 through the open top surfaces of the guide element 3 and can flow to an outlet opening 18 of the generator housing 1. Such flow path however is not properly desired here. Rather, in the circumferential boundary wall 30 of the guide element 3 passage openings 38 are provided, of which one can be seen in the cross-sectional representation of FIG. 1 and through which gas generated from a pyrotechnic charge L in the combustion space R will properly get to the outlet openings 18 of the generator housing 1.

At least one filter unit 4 of the gas generator assembly is associated with the passage openings 38 such that the gas flowing through a passage opening 38 in each case passes the at least one filter unit 4 before it can get to an outlet opening 18 of the generator housing 1. In the exemplary embodiment, the filter unit 4 therefor is arranged behind a respective passage opening 38—as seen from the combustion space R. More exactly, the filter unit 4 is disposed between the circumferential boundary wall 30 of the guide element 3 and the side walls 12, 17 of the generator housing 1 such that the at least one filter unit 4 covers the passage openings 38 in the guide element 3. The filter unit 4 therefor can be formed for example ring-shaped (around the axis A) in cross-section.

To prevent that gas generated in the combustion space R can get through the open top surfaces of the guide element 3 to an outlet opening 18 of the generator housing 1 without passing the filter unit, the guide element 3 in the present case will tightly bear against the generator housing 1 in particular in the region of its second end portion 32. Otherwise, gas exiting from the combustion space R through the top surface formed on the second end portion 32 might flow along the inner surface of the generator housing 1 to an outlet opening 18 of the generator housing 1 without passing the filter unit 4.

To provide for a sealing abutment of the guide element 3 in the region of the second end portion 32 at the generator housing 1 or more exactly at its inner wall (in the exemplary embodiment concretely the inner wall 15a of the first housing part 15), the guide element 3 has a tear region 34 in the region of its second end portion 32. In FIG. 1 the same can be seen to the left of the axis A, where the two housing parts 10, 15 of the generator housing 1 are shown before the final assembly. The tear region 34 is formed by molding the lateral boundary wall 30 of the guide element 3 to the outside, i.e. in the direction of the inner surface of the generator housing 1. In the exemplary embodiment, the tear region 34 extends around the lateral boundary wall 30 of the guide element 3 in a ring-shaped or more exactly circularly ring-shaped manner.

During the assembly of the generator housing 1, while the guide element 3 already is properly arranged in the first housing part 10 and the second housing part 15 is properly joined with the first housing part 10—corresponding to the transition from the left to the right side in FIG. 1—this tear region 34 of the guide element 3 is deformed such that the resulting deformation area 35 fully and sealingly bears against the inner surface 15a of the generator housing 1, more exactly of the second housing part 15. At the same time, the bottom of the charge container 26 as a result supports on an inner surface of the generator housing 1, more exactly on the bottom 16 of the second housing part 15.

In the exemplary embodiment, the deformation force required for the deformation of the guide element 3 in the (preformed) tear region 34 is applied during the assembly of the two housing parts 10, 15 by the action of the second housing part 15 (with its bottom 16) on the second end portion 32 of the guide element 3. This force acts along the mounting direction M which coincides with the axis A of the generator housing 1 and hence also of the guide element 3. Because of the preforming of the guide element 3 in the tear region 34 by being molded radially to the outside, this force results in a deformation of the guide element both in axial and in radial direction (vertically to the axis A), so that the deformation area 35 shown on the right side in FIG. 1 is formed. Via this deformation area, the guide element 3 fully and at the same time sealingly (extending radially to the outside and hence annularly) bears against the inner surface 15a of the generator housing 1. As a result, gas originating from the combustion space R, which exits through the top surface on the second end portion 32 of the guide element 3, cannot flow along the inner surface of the generator housing 1 to an outlet opening 18. It thereby is achieved that merely the gases properly exiting from the combustion space R through a passage opening 38 of the guide element 3, which subsequently pass the filter unit 4, get to an outlet opening 18 in the generator housing 1 in order to be released for inflating a gas bag.

As an alternative to an automatic deformation of the guide element 3 during the assembly of the generator housing 1 an additional tool can also be used therefor, for which however a sufficient accessibility of the guide element 3 must be ensured in the corresponding mounting step.

The configuration of a gas generator assembly, as described here with reference to FIG. 1, has a plurality of advantages:

1. It provides for a construction of the (tubular) guide element 3 open at both ends, whereby the weight of the guide element is reduced and furthermore the installation space available for other gas generator components is increased. In addition, the construction of the guide element 3 open at both ends provides for a direct contact between the pyrotechnic charge arranged in the combustion space R and the second housing part 15, so that heat applied from outside quickly and reliably leads to an intended self-activation of the pyrotechnic charge.
2. This provides for a flexible mounting sequence; for example, filling of the combustion space R with a pyrotechnic charge can be effected from each of the two axial ends of the combustion space.
3. Furthermore, due to the deformation of the guide element 3 only after its insertion into one of the housing parts 10, 15 a reliable abutment of the deformation area 35 at an inner surface 10a, 15a of the generator housing 1 can be ensured independent of tolerances of individual components of the gas generator assembly.
4. A reliable contact of the charge container 26 with the bottom 16 of the second housing part 15 also can be ensured. Thus, a thermally favorable heat transfer possibility is ensured, which in the case of a burning vehicle can initiate a desired automatic activation of the pyrotechnic material present in the charge container 26 and hence of the gas generator.

The invention claimed is:

1. A gas generator assembly for an airbag module of a motor vehicle, comprising
   a generator housing with a first housing part and a second housing part,
   a combustion space formed in the generator housing for accommodating a pyrotechnic charge from which a gas for inflating a gas bag of the airbag module can be generated by combustion,
   at least one outlet opening of the generator housing, through which gas generated in the combustion space can be released for inflating the gas bag,
   at least one filter unit arranged in the generator housing for filtering the gas generated from the pyrotechnic charge, and
   a guide element arranged in the generator housing, by means of which the generated gas is guided to the at least one outlet opening,
   wherein the guide element is of tubular form and has at least one deformation area by which the guide element bears against the second housing part of the gas generator assembly in order to block a flow path by which gas generated in the combustion space would get to the at least one outlet opening without passing the at least one filter unit, wherein the at least one deformation area has been produced after an insertion of the guide element into the generator housing, wherein the guide element includes a tear region in form of a pre-deformation and/or a material weakening, wherein the guide element is configured to deform at the tear region upon application of an external force to thereby produced the at least one deformation area; and
   wherein the at least one deformation area of the guide element bears against an inner surface of the generator housing adjacent to the outlet opening of the generator housing.

2. The gas generator assembly according to claim 1, wherein the at least one deformation area has been produced in an additional working step after the original forming of the guide element.

3. The gas generator assembly according to claim 1, wherein the at least one deformation area has been produced during the assembly of the generator housing.

4. The gas generator assembly according to claim 1, wherein the generator housing is of multipart design.

5. The gas generator assembly according to claim 3, wherein the generator housing is of multipart design and the at least one deformation area of the guide element has been produced by the fact that during the assembly of the generator housing the second housing part of the generator housing acts on the guide element.

6. The gas generator assembly according to claim 1, wherein due to the abutment at a component of the gas generator assembly the deformation area closes a possible flow path of gas generated in the combustion chamber along a wall of the generator housing to the outlet opening.

7. The gas generator assembly according to claim 1, wherein the guide element surrounds the combustion space.

8. The gas generator assembly according to claim 1, wherein the guide element is open at its two axial ends.

9. The gas generator assembly according to claim 1, wherein the guide element has a passage opening through which gas can exit from the combustion space in order to get to the at least one outlet opening of the generator housing.

10. The gas generator assembly according to claim 9, wherein the filter unit is arranged in the generator housing such that gas flowing from the combustion space through the passage opening of the guide element passes the filter unit before it gets to the at least one outlet opening of the generator housing.

11. A method for manufacturing a gas generator assembly, comprising the steps of:
- providing a generator housing with a first housing part and a second housing part,
- forming a combustion space formed in the generator housing for accommodating a pyrotechnic charge from which a gas can be generated by combustion,
- forming at least one outlet opening through which gas generated in the combustion space can be released for inflating a gas bag,
- forming at least one filter unit arranged in the generator housing for filtering the gas generated from the pyrotechnic charge, and
- arranging a guide element in the generator housing, by means of which gas generated in the combustion space can be guided to the at least one outflow opening, wherein the guide element is of tubular form, has at least one deformation area in form of a pre-deformation and/or a material weakening and is deformed at the deformation area after being arranged in the generator housing, so that the guide element bears against the second housing part of the gas generator assembly in order to block a possible flow path of gases generated in the combustion space to the at least one outlet opening, wherein the guide element deforms in the deformation area upon application of an external force, and wherein the at least one deformation area of the guide element bears against an inner surface of the generator housing adjacent to the at least one outlet opening of the generator housing.

12. The method according to claim 10, wherein the guide element is introduced into the first housing part to be arranged in the generator housing and that the at least one deformation area of the guide element is produced by the fact that during the assembly of the generator housing the second housing part of the generator housing acts on the guide element.

13. The method according to claim 11, wherein the force applied for producing the deformation area acts on the guide element along a tube axis and the guide element thereby is deformed both along the tube axis and vertically thereto to form the deformation area.

14. A method for manufacturing a gas generator assembly, comprising the steps of:
- providing a generator housing with a first housing part and a second housing part,
- forming a combustion space formed in the generator housing for accommodating a pyrotechnic charge from which a gas can be generated by combustion,
- forming at least one outlet opening through which gas generated in the combustion space can be released for inflating a gas bag,
- arranging at least one filter unit in the generator housing for filtering the gas generated from the pyrotechnic charge, and
- arranging a guide element in the generator housing, by means of which gas generated in the combustion space can be guided to the at least one outflow opening, wherein the guide element is of tubular form and includes a deformation area that is formed after the guide element is arranged in the generator housing, so that the guide element bears against the second housing part of the gas generator assembly in order to block a possible flow path of gases generated in the combustion space to the at least one outlet opening, and wherein the force applied for producing the deformation area acts on the guide element along a tube axis and the guide element thereby is deformed both along the tube axis and vertically thereto to form the deformation area, and wherein the deformation area of the guide element bears against an inner surface of the generator housing adjacent to the at least one outlet opening of the generator housing.

\* \* \* \* \*